United States Patent
Rajput

(10) Patent No.: US 8,719,825 B2
(45) Date of Patent: May 6, 2014

(54) PROMPTING FOR EXECUTION OR DELAY OF SCHEDULED JOB

(75) Inventor: Manjit Singh Rajput, Bangalore (IN)

(73) Assignee: SAP AG, Walldorf (DE)

( * ) Notice: Subject to any disclaimer, the term of this patent is extended or adjusted under 35 U.S.C. 154(b) by 1543 days.

(21) Appl. No.: 11/206,383

(22) Filed: Aug. 17, 2005

(65) Prior Publication Data

US 2007/0044099 A1 Feb. 22, 2007

(51) Int. Cl.
*G06F 9/46* (2006.01)
*G06F 9/445* (2006.01)

(52) U.S. Cl.
USPC ........... 718/102; 718/100; 718/101; 718/107; 717/174

(58) Field of Classification Search
USPC ................... 718/100, 102, 107, 104; 717/173
See application file for complete search history.

(56) References Cited

U.S. PATENT DOCUMENTS

| | | | | |
|---|---|---|---|---|
| 5,465,354 | A * | 11/1995 | Hirosawa et al. | 718/106 |
| 5,845,077 | A * | 12/1998 | Fawcett | 709/221 |
| 5,902,352 | A * | 5/1999 | Chou et al. | 718/102 |
| 5,931,878 | A * | 8/1999 | Chapin, Jr. | 701/30 |
| 6,049,671 | A * | 4/2000 | Slivka et al. | 717/173 |
| 6,108,640 | A * | 8/2000 | Slotznick | 705/26 |
| 6,157,465 | A * | 12/2000 | Suda et al. | 358/407 |
| 6,230,284 | B1 * | 5/2001 | Lillevold | 714/13 |
| 6,353,926 | B1 * | 3/2002 | Parthesarathy et al. | 717/170 |
| 6,385,662 | B1 * | 5/2002 | Moon et al. | 719/318 |
| 6,594,682 | B2 * | 7/2003 | Peterson et al. | 718/102 |
| 6,636,888 | B1 * | 10/2003 | Bookspan et al. | 709/203 |
| 6,895,292 | B2 * | 5/2005 | Fromherz et al. | 700/101 |
| 7,120,684 | B2 * | 10/2006 | Lawing et al. | 709/223 |
| 7,149,889 | B2 * | 12/2006 | Stalker et al. | 713/2 |
| 7,237,268 | B2 * | 6/2007 | Fields | 726/27 |
| 7,240,348 | B2 * | 7/2007 | Murase et al. | 718/102 |
| 7,340,514 | B2 * | 3/2008 | Yamada et al. | 709/223 |
| 7,441,250 | B2 * | 10/2008 | Katz et al. | 719/318 |
| 7,454,752 | B2 * | 11/2008 | Masuoka | 718/102 |
| 7,584,467 | B2 * | 9/2009 | Wickham et al. | 717/171 |
| 7,716,708 | B2 * | 5/2010 | Nishimura et al. | 725/97 |
| 7,805,630 | B2 * | 9/2010 | Kerner et al. | 714/5.1 |
| 2001/0042112 | A1 * | 11/2001 | Slivka et al. | 709/220 |
| 2002/0044764 | A1 * | 4/2002 | Akamatsu et al. | 386/92 |
| 2002/0073198 | A1 * | 6/2002 | Sakata | 709/224 |
| 2002/0116513 | A1 * | 8/2002 | Heinonen | 709/230 |
| 2002/0143770 | A1 * | 10/2002 | Schran et al. | 707/10 |
| 2004/0003395 | A1 * | 1/2004 | Srinivas et al. | 725/34 |
| 2004/0093596 | A1 * | 5/2004 | Koyano | 717/171 |
| 2004/0139426 | A1 * | 7/2004 | Wu | 717/120 |
| 2004/0187104 | A1 * | 9/2004 | Sardesai et al. | 717/174 |
| 2004/0203644 | A1 * | 10/2004 | Anders et al. | 455/414.1 |
| 2005/0125489 | A1 * | 6/2005 | Hanes | 709/202 |
| 2005/0132206 | A1 * | 6/2005 | Palliyil et al. | 713/188 |
| 2005/0196030 | A1 * | 9/2005 | Schofield et al. | 382/132 |
| 2005/0204388 | A1 * | 9/2005 | Knudson et al. | 725/58 |
| 2006/0106806 | A1 * | 5/2006 | Sperling et al. | 707/10 |

* cited by examiner

*Primary Examiner* — Meng An
*Assistant Examiner* — Tammy Lee
(74) *Attorney, Agent, or Firm* — Kenyon & Kenyon LLP

(57) ABSTRACT

The present invention provides for the adjustment of the timing of a scheduled job including determining when the execution time of a scheduled job is within a predetermined time period. Prior to this time, a job execution notification is generated and submitted to an end user. The notification includes a request for time delay in the event the job should not be executed on the time noted. If the job should be delayed, a user may submit a delay request including a time delay. Upon receipt, an internal timing parameter is temporarily reset based on the delay request. The job is then automatically rescheduled for the prescribed time. If no other delay is incurred, once the job is executed, the internal timing parameter is then reset to its original time value.

29 Claims, 4 Drawing Sheets

| JOB | EXECUTION TIME | NOTIFICATION TIME |
|---|---|---|
| A | 1:15 | 6 HOURS |
| B | 1:40 | 6 HOURS |
| C | 1:45 | 6 HOURS |
| D | 2:15 | 7 HOURS |
| ... | ... | ... |
| N | 5:35 | X HOURS |

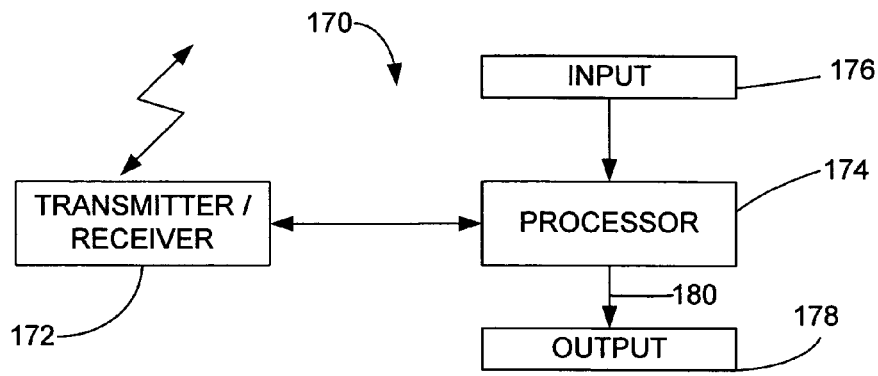
FIG. 4
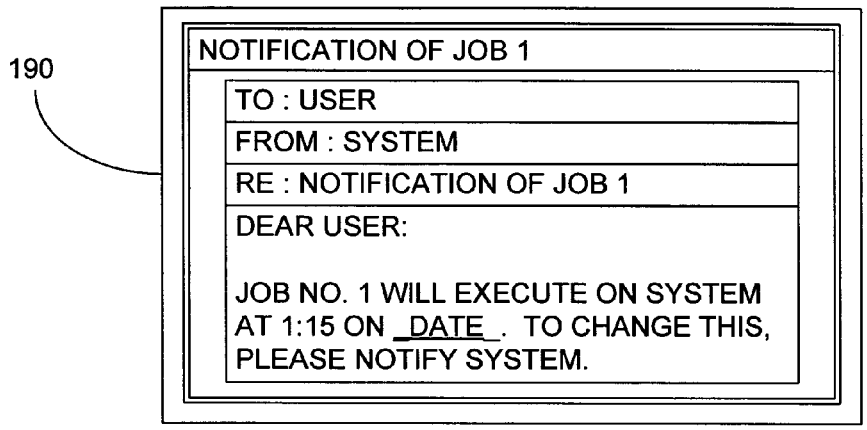
FIG. 5
FIG. 6

PROMPTING FOR EXECUTION OR DELAY OF SCHEDULED JOB

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to the execution of scheduled jobs and more specifically to the oversight and time-adjustment of the execution of scheduled jobs.

In existing systems that execute scheduled jobs, these jobs are commonly referred to as batch processes. In some UNIX processing environments, these scheduled jobs are also referred to as chron jobs. These batch processes are typically executed at off-times when processing requirements for a main system are reduced. For example, batch processes may be performed during late night-time and early morning hours when system users are not accessing a central processing system. The processing system may then readily dedicate the processing resources for completing the batch processes or scheduled jobs.

Increased computing resources and system efficiencies have reduced the time-sensitive nature of batch processing. While many batch processes are run during off-peak hours, the timing of these processes are typically dictated by other means, such as the availability and time-sensitivity of the data being processed. For example, a batch process might be running a month-end report including billing information for multiple clients or customers. The scheduled execution of the job is based on the timing of the billing information being received in the processing system. In this example, the job is scheduled based on a reasonable determination of when the requisite billing information is available from the billing system.

Scheduled jobs are also complicated by the increased complexity of multiple processing systems. When a processing environment includes one or more processing systems capable of running the batch processes and multiple ancillary systems that provide the data for these jobs, problems can arise. If there is an error with any one of the multiple different processing systems in the processing environment, this may make the batch process incorrect. In addition to problems or errors in the ancillary system, there may also be concerns that these ancillary systems do not yet have complete and proper data sets, e.g. not all the requisite information is compiled yet. For example, if the batch process includes multiple invoices and one billing system does not have current invoice data, the scheduled job will run an improper report. In fact, the scheduled job will most likely have to be re-executed when the missing data is properly assembled or compiled. Improperly running scheduled job is not only extremely inefficient, but a significant waste of processing resources.

As the number of interdependent systems increases, there are also other concerns besides the integrity of the data used for the scheduled job. For example, if one system goes down for any reason, that may cause significant disruptions in the complete processing environment for one or more scheduled jobs, including further scheduled jobs that are dependent upon the generated data of previous jobs. As multi-processing environments globally interconnect, the potential for errors with jobs using improper increases.

In current processing systems, scheduled jobs are either executed or cancelled. If a job is scheduled for a predetermined time, that job is then executed at said time. Should there be concerns about the integrity of the data processing in the schedule job, a user must manually over-ride a job scheduling system to terminate the job. In some systems, a user must navigate multiple levels to delay or cancel the job. When a user manually resets an execution time for a particular job, this requires permanently resetting the defined execution time for the job. Current systems do not provide for a temporary one-time reset. Therefore, when this occurs, a user must thereupon re-reset the job execution time back to its original time after the job is executed.

BRIEF DESCRIPTION OF THE DRAWINGS

FIG. 4 illustrates a block diagram of one embodiment of a remote device for receiving a job execution notification;

FIG. 5 illustrates a representation of a screen shot of one embodiment of an execution notification;

FIG. 6 illustrates another embodiment of a screen shot of an execution notification.

DETAILED DESCRIPTION

Scheduled jobs can be managed by notifying an end user prior to the scheduled execution time. A system that executes the job receives one or more data sets including data to be processed by the job. In a multi-processing environment, one more remote processing devices may generate the data sets, where these remote processing devices may be different processing systems, such as enterprise resource planning (ERP) systems, customer relations management (CRM) systems or other systems.

A central processing device may be in any processing environment providing for the execution of the scheduled jobs. As described above, scheduled jobs, also known as batch processes, are usually performed at off-peak processing times and utilize one or more of the data sets. Typically, these data sets are generated by the remote processing devices and provided to the central processing device. In a typical multi-system environment, the remote processing devices communicate with the central processing device across one or more networks in accordance with known network interfacing techniques.

For each of the scheduled jobs, the processing device determines when a scheduled job is to about to be executed. The amount of time prior to the execution may be preset or adjusted based on user preferences. Prior to the execution of the scheduled job, the processing device notifies the end user. Based on this notification, the job may be temporarily delayed, if the processing device is so instructed. Therefore, the timed execution of the scheduled jobs may be managed through informed notifications of one or more end users.

Figures 1, 2:
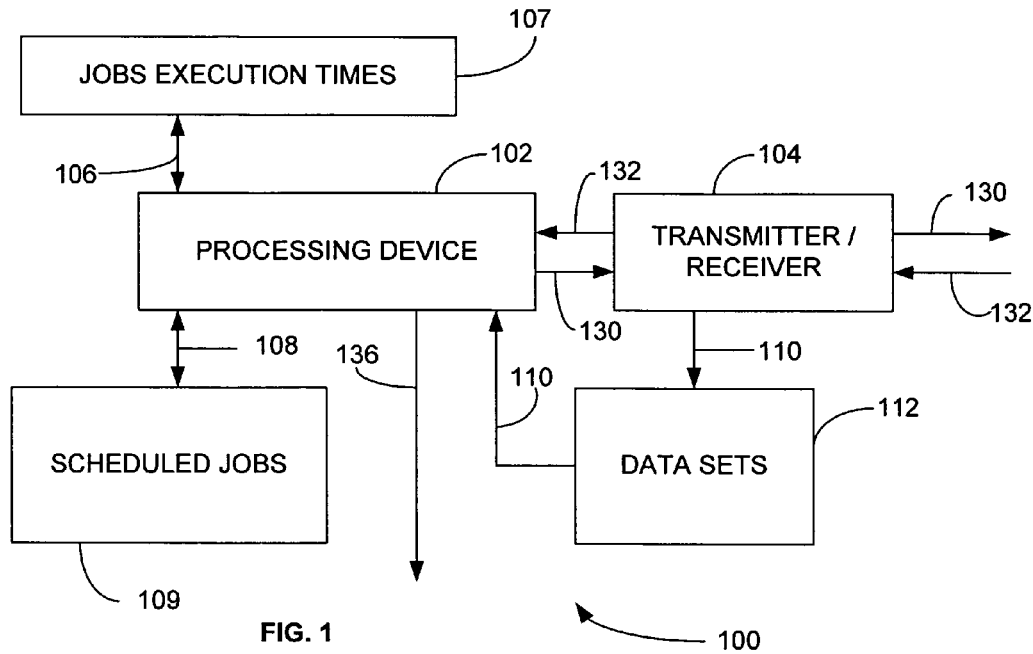
FIG. 1 illustrates a block diagram of one embodiment of an apparatus for managing the timing of the execution of a scheduled job.
FIG. 2 illustrates a graphical representation of a scheduled job execution and notification list.

FIG. 1 illustrates one embodiment of an apparatus 100 for managing the timing of the execution of scheduled jobs. The apparatus 100 includes a processing device 102, a transmitter/receiver 104, a memory device 107 storing a list of job execution times 106, a memory device 109 storing a list of scheduled jobs 108 and one or more data sets 110 stored in a memory location 112. The processing device 102 is operative to execute the scheduled jobs 108 at defined times. The scheduled jobs 108 includes batch process operations as recognized by one having ordinary skill in the art. The scheduled jobs 108 are typically performed using the data sets 110, wherein the data sets are typically generated by remote processing systems (not shown).

In one embodiment, the transmitter/receiver 104 receives these data sets 110 and are stored in the memory location 112. In another embodiment, the data sets 110 may be extracted at the time of executing the scheduled job. The processing device 102, in response to executable instructions, monitors the execution times 106 of the scheduled jobs 108. The monitoring of these jobs 108 includes reading a notification time indicator. FIG. 2 illustrates a graphical representation of a table of multiple jobs 108 having execution times 106 and an associated notification time 120.

The notification time 120 may be the same for all jobs, such as predetermined by a user, or may be different for different jobs. For example, listed in the table of FIG. 2, jobs A, B and C 122, 124 and 126, all include the notification time 120 of six hours. These jobs 122, 124 and 126 include different execution times 106 so the notification will be sent at different times. Based on a time determined by the execution time 106 minus the notification time 120, a job execution notification 130 will be transmitted to the end user. The notification may include a message regarding the pending job to be executed and a request to accept or change the execution time.

In one embodiment, the processing device 102 monitors the execution time 106 in relation to the notification time 120. For example, if the processing device 102 is monitoring job A 122 with the execution time of 1:15 and a notification time of six hours, the processing device will generate a job execution notification 130 on or before six hours prior to the execution time of 1:15. Therefore, in this example, the job execution notification, which includes notification to an end user that the scheduled job is about to be executed, be generated on or before 19:15 the day before.

The transmitter/receiver 104 may be a data interface for accessing one of more networks. The transmitter/receiver 104 may also be an interface for accessing a broadcast network such that the processing device 102 may be able to transmit and/or receive communications, such as wireless or network protocol communications.

In one embodiment, the end user then appropriately receives the job execution notification 130. The destination for the transmission of the notification may be determined by an internal setting within the processing device 102 such that the appropriate end user may be notified. For example, a setting may indicate that if the notification is transmitted between the hours of eight in the morning and six in the evening, the notification is transmitted via an electronic mail message and if it is transmitted after 6 o'clock in the evening, it is transmitted to a pager or mobile device.

The end user receives the notification command 130 and may prepare a response. In one embodiment, the notification command may be a simple message indicating the upcoming execution of the scheduled job. Although, in another embodiment the notification may include a reply feature allowing for the user to indicate a particular delay.

As discussed in further detail below, the user may enter a delay field and submit a reply 132 back to the processing device 102 through the transmitter/receiver 104. The processing device 102, upon receiving the reply 132, determines if the reply 132 includes the delay field, wherein the delay field indicates a particular time delay for executing the scheduled job. Typically, the delay field includes a numerical value representing a particular time interval, such as a number of hours and/or minutes for delaying the execution of the scheduled job. If the processing device determines that the reply includes the delay field, the processing device may then temporarily reset the execution time based on this delay field. For example, referring back to FIG. 2, if scheduled job A was delayed, based on a delay field, of 12 hours, the execution time 106 would be reset to 13:15.

In one embodiment, if the processing device 102 does not receive a reply or a reply is received that does not include a delay field, the processing device 102 will then automatically execute the scheduled job at the prescribed time. The processing device 102 thereupon generates the scheduled job output 136 in accordance with the predetermined execution time 106 of FIG. 2. For example, if the scheduled job is a sales report, the data sets may be sales records, inventory records, sales associate times records and any other information for running the job.

Therefore, the processing device 102 provides for the management of the timing of the execution of scheduled jobs based on monitoring the execution time of the job in relation to a predescribed notification time. The processing device 102 may do this for a plurality of scheduled jobs, monitoring each of the jobs at different times and generating and transmitting the job execution notifications at the preset times prior to execution. In another embodiment, multiple notifications may be combined and sent in a single packet of notifications or combined into a single transmission.

It is noted that FIG. 2 is illustrative of any suitable number of scheduled jobs and merely graphically represents data used by the processing device 102 in managing the execution of the scheduled jobs 108. Utilization of other suitable types of data for monitoring the scheduled jobs and tracking the execution times are also envisioned by the apparatus 100.

Figure 3:
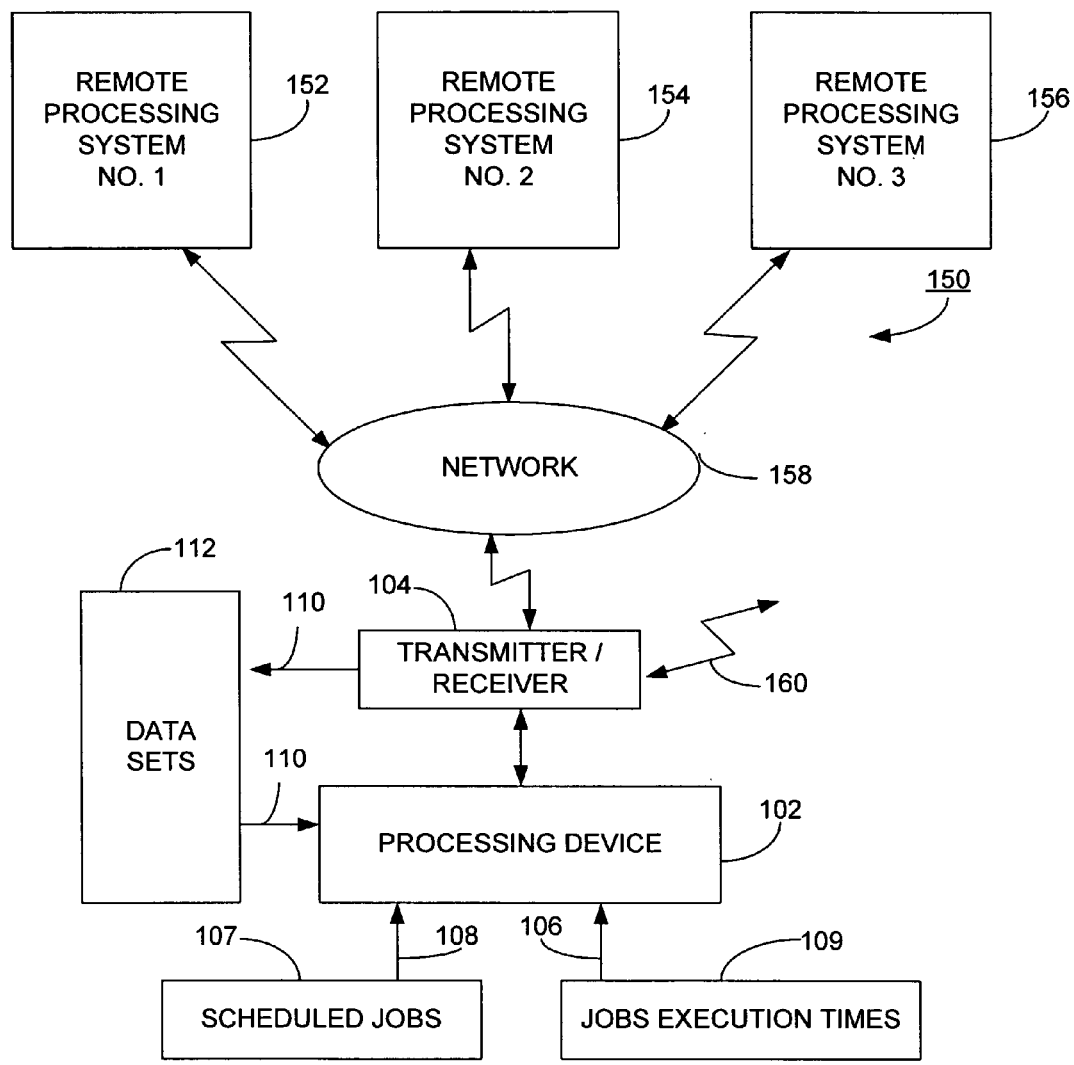
FIG. 3 illustrates a block diagram of one embodiment of a system for managing the timing of the execution of scheduled job.

FIG. 3 illustrates one embodiment of a system 150 for managing the timing of the execution of scheduled jobs. The system 150 includes a first remote processing system 152, a second remote processing system 154 and a third remote processing system 156. These remote processing systems 152, 154 and 156 may be any suitable processing system or environment generating data sets. For example, remote processing system one 152 may be a billing system generating billing information, the second system 154 tracking inventory and the third system 156 tracking contact information. Although, any suitable number of systems may be utilized and provide for any correspondingly suitable number of data sets, where the data sets include data used by the processing device 102 for executing the scheduled jobs. Each of the remote processing systems 152, 154 and 156 are in operative communication with the transmitter/receiver 104 across a network 158. In one embodiment, the remote processing systems generate data sets 110 that may be stored in the data sets storage location 112.

Similar to the above discussion regarding FIG. 1, the processing device 102 monitors the scheduled jobs that are scheduled to be executed and the corresponding job execution times 106. Based on a comparison of tracking the execution times, the processing device 102 may correspondingly detect when a scheduled job is set to execute at a predetermined time interval determined by the corresponding notification time 120.

The transmitter/receiver 104 thereupon provides the notification to a user, such as a wireless transmission 160 or a wired transmission through the network 158. In the system 150, the processing device 102 receives the data sets 110 from the different remote processing systems 152, 154 and 156. In a further embodiment, the data sets 110 may not be stored in the temporary storage location 112, but may be called by a data call command or other technique at the appropriate job execution time.

FIG. 4 illustrates one embodiment of a device 170 capable of receiving the notification 130 and transmitting a reply 132. The device 170 includes a transmitter/receiver 172 coupled to a processor 174 coupled to an input device 176 and an output device 178. The device 170 may operate in accordance with known mobile devices techniques for transmitting and receiving communications. The processor 174 includes further functionality in response to executable instructions allowing for the receipt of the notification 130. The processor 174 upon receiving the notification 130 provides the display 180 to the output device 178. The display provides a visual indication of the upcoming scheduled job, the proposed execution time and other suitable information. As described below with regards to FIGS. 5 and 6, the output may further include a) an indicator for a user to input delay information. For example, in one embodiment the user may input into a toggle field delay information in the input device 176. This delay information is then provided to the processor 174 such that the processor thereupon generates the reply 132. The processor 174, in providing a visual display of the delay notification and corresponding generation and transmission of the reply allows for the remote management of the execution of scheduled jobs by a user using this remote device 170.

FIG. 5 illustrates an representative example of a screenshot 190 that may be visible on the output display 178 of FIG. 4. In one embodiment, the notification may be sent as a message, such as an electronic mail message or other messaging system message. In this embodiment, the notification merely provides direct notification to the designated user.

As illustrated on the screenshot 190, the message is addressed to the user and includes a message that a particular job is to be executed at a particular time. Using the examples discussed above, the notification provides a message regarding the first job 122 of FIG. 2. The notification indicates the job 122 will execute at 1:15. In one embodiment, this message is transmitted at the time dictated by the notification time 120 of FIG. 2. So in that embodiment, the notification is transmitted at 7:15 in the evening, the night before and received at the mobile device 170 as soon as the notification is transmitted through the appropriate transmission systems.

The notification screen shot 190 of FIG. 5 illustrates a one-way notification. In order for a user to reply, the user may then sent a message back to the system, such as selected a "reply" feature or transmitting a message back. In one embodiment, for a short messaging system message, there may be defined protocols for the format of the message, such as indicating the job number followed by a delay time. Regardless of the specific technique, with the screen shot 190 of FIG. 5, the user must manually submit a reply back to the system.

FIG. 6 illustrates a second screen shot 192 including an interactive notification. Similar to the screenshot of FIG. 5, this uses the example of job 1 122 of FIG. 2 being executing at 1:15. Although, this screenshot allows for user-interactivity. Included in the display are several selectable boxes allowing the user to choose to either execute the job as planned or to delay the job. In one embodiment, a user may scroll a cursor or use a stylus in a touch-screen device 170 to select one of the choices. In another embodiment, a user may select designated keys to select an action.

In the event the user selects to delay the execution, a second input provides for the time delay. Illustrated in screen shot 192, the time is designated in hours, but may be in any suitable time designation, such as minutes, days, weeks, etc. In this input, the user may physically enter a number, such as by using a keypad or touch screen. The input may also be a pull-down menu having a variety of different choices, such as the numbers 2-48 in 4 hour intervals.

Once the time delay input has been entered, the user may select the submit button. Once again, if the user is using a stylus or a touch screen, this may be manually selected. In a navigational or keys selection scenario, appropriate user strokes may be used to select the submit button. In response to the selection of the submit button, the processor 174 of FIG. 4 translates the users selections into an appropriate reply. If the selection was to delay, the time input is then used for the delay field in the reply. This reply is then transmitted back to user for temporarily resetting the execution time of the scheduled job if requested.

Figure 7:
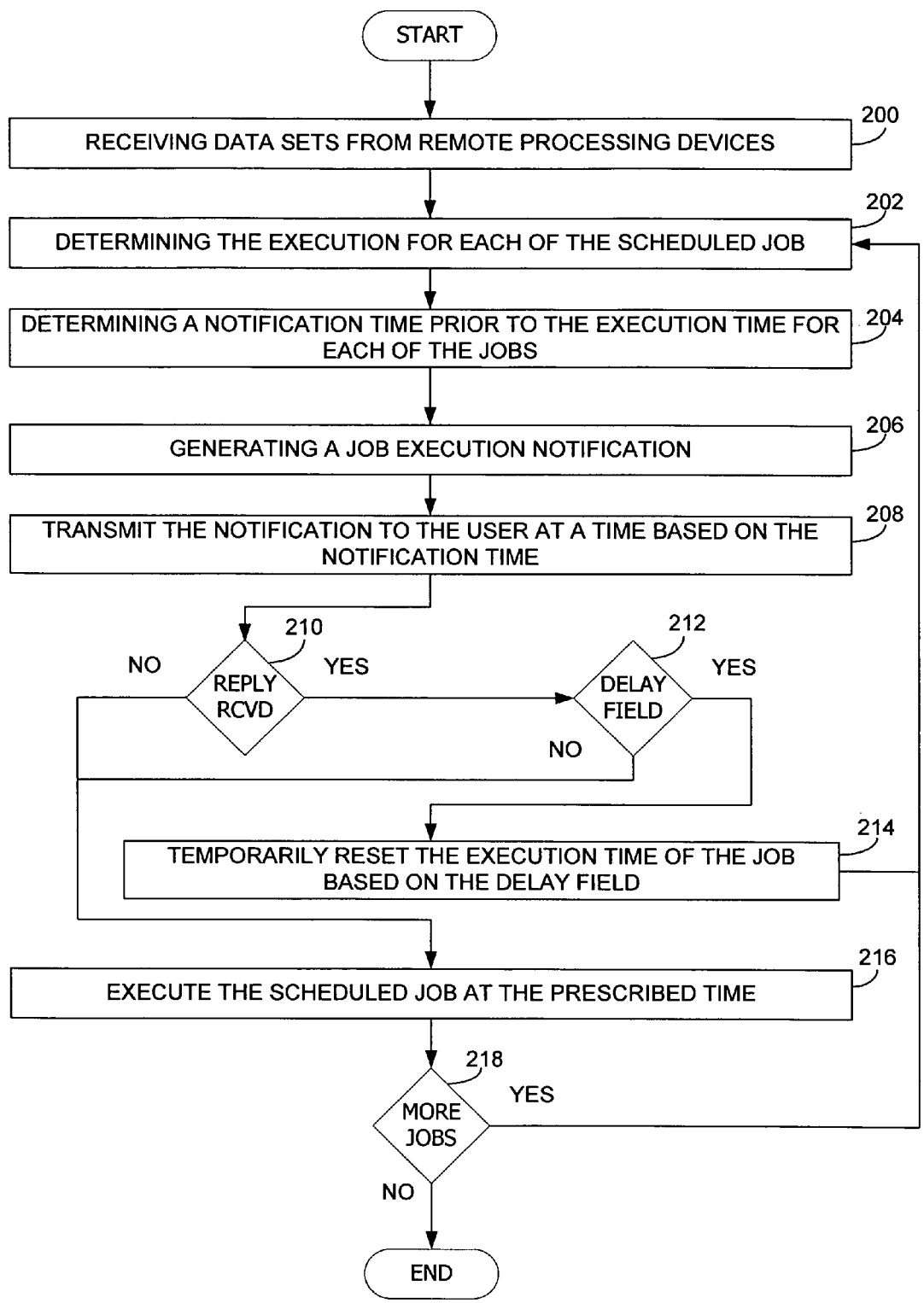
FIG. 7 illustrates a flow chart of the steps of an embodiment of a method for managing the timing of the execution of scheduled jobs.

FIG. 7 illustrates the steps of one embodiment of the method for executing a scheduled job. The method begins, step 200, by receiving data sets from a remote processing device. As discussed above regarding FIG. 3, the remote processing systems 152, 154 and 156 may provide the corresponding data sets 110. In one embodiment, the sets may be temporarily stored within the memory 112 or may be called at the corresponding appropriate time when the scheduled job is to be executed. The next step, step 202, is determining the execution time for each of the scheduled jobs. The time may be determined by monitoring a list of job execution times 106 in relation to notification time indicators 120.

The next step, step 204, is determining a notification time prior to the execution time for each of the jobs. In one embodiment, the notification time is the time representative of the interval prior to the appropriate job execution.

The next step, step 206, is generating a job execution notification. This notification may be a wireless message, a protocol message, an electronic mail communication, an SMS message or any other suitable of notification. In one embodiment, the notification includes a reply mechanism allowing a user to reply to the notification. The next step, 208 is to transmit the notification to the user at a time based on the notification time. In one embodiment, this may be performed by the transmitter/receiver 104 and may be in connection with the network 158 or any other suitable technique.

In step 210, a decision is made, if a reply is received. Typically, the reply would be received by the transmitter/receiver 104 through any suitable incoming technique, such as across network 158. If the reply is received, step 212 is to determine if the reply includes a delay field. If a delay field is included, step 214 is to temporarily reset the execution time of the job based on the delay field. For example, if the delay field indicates a twelve hour delay, the scheduled job C 126 of FIG. 2 would be therein delayed until 13 hours and 45 minutes. The method would therein revert back to step 202 to once again determine the execution time for the scheduled jobs. The method iteratively repeats steps 202 through 208, monitoring each of the scheduled job based on either an original job execution time or a temporarily reset execution time. Therefore, in one embodiment, the processing device 102 is not concerned with whether the listed execution time 106 is an original execution time or a delayed execution time.

Although, one embodiment may include a tracking indicator of the number of delayed executions to provide such information to the user when sending the user the appropriate job execution notification. For example, if a user has previously reset a job execution time multiple times, they may wish to include that information within the job notification.

In the event under step 210 or step 212, the answer is in the negative, the method reverts to step 216 which is executing the scheduled job at the prescribed time. Therefore, using the exemplary embodiment of scheduled job A 122 of FIG. 2, at 6 hours prior to the execution time 106, the job execution notification is transmitted. Under steps 210 or 212, either a reply is not received or a reply is received that does not include a delay field, scheduled job A 122 will then be appropriately executed by the processing device 102 at the determined time. After the execution of the job in step 216, any temporarily reset execution times will be automatically reset to their original times. This may be accomplished by deleting the temporary time or may include the processing device 102 discarding a temporary value which includes the reset time.

Continuing with this embodiment, the method proceeds to step 218 where a determination is made if there are more scheduled jobs. In a typical processing environment the answer to this will be in the affirmative, reverting the process back to step 202. For example, with respect to FIG. 2 there are a number of scheduled jobs and there at preset execution times 106. Not illustrated in FIG. 2, the execution time may also include a date or a larger time indicator, such as the first of the month or the first of every third month or any other time based indicator. Therefore, the method repeats through steps 202-218 for each of the scheduled jobs. It is also noted, in one embodiment, the data sets received in step 200 may be received at any point in time, such as when they are timely generated by the remote processing systems 152, 154 and 156. As such, the method for managing the timing of the execution of scheduled jobs is complete.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. An apparatus for managing the timing of the execution of a scheduled job that is a batch process executed by a computer system, the apparatus comprising:
a memory device coupled to a processing device having a list of scheduled jobs, execution times and notification times stored therein; and
the processing device for executing the scheduled job at a prescribed execution time;
wherein:
the processing device, prior to the prescribed execution time, is operative to:
obtain a notification time from the memory device prior to the prescribed execution time for the scheduled job;
generate a job execution notification that indicates:
the execution time of the scheduled job, and
a tracking indicator of a number of times the job execution has been delayed; and
transmit the job execution notification to a user based on the determined notification time, the notification displaying the execution time and the tracking indicator to the user; and
if a reply is received in response to the job execution notification to the user, the processing device:
determines if the reply includes a user-configured delay field;
if the user-configured delay field is included, temporarily resets the prescribed execution time to a reset execution time based on a time value in the user-configured delay field;
generates a further job execution notification at a subsequent notification time prior to the reset prescribed execution time; and
if no reply is received in response to the notification to the user, executes the scheduled job at the prescribed execution time.

2. The apparatus of claim 1 further comprising: at least one remote processing device operative to generate one or more data sets.

3. The apparatus of claim 2 wherein the processing device executes the scheduled job using at least one of the data sets.

4. The apparatus of claim 3 further comprising:
a temporary data set buffer for storing the data sets.

5. The apparatus of claim 1, wherein the processing device is further operative to:
generate a next job execution notification;
transmit the generated next job execution notification to the user;
if a reply is received to the generated next job execution notification:
determine if the reply to the generated next job execution notification includes a delay field;
if the delay field is included, temporarily reset the prescribed execution time based on a time value in the delay field included in the reply to the generated next job execution notification; and
if no reply to the generated next job execution notification is received, execute the scheduled job at the prescribed execution time.

6. The apparatus of claim 1 wherein the notification is transmitted to the user using a wireless transmission.

7. The apparatus of claim 6 wherein the notification includes a short messaging system (SMS) message.

8. The apparatus of claim 1, wherein a setting in the processing device indicates different destination devices to which the job execution notification is to be transmitted in order to notify the user.

9. The apparatus of claim 1, wherein multiple notifications are combined and sent in a single packet of notifications or combined into a single transmission.

10. A method for managing the timing of the execution of a scheduled job that is a batch process executed by a computer system, the method comprising:
retrieving, by a processing device, a list of scheduled jobs;
monitoring execution times of the scheduled jobs, wherein each of the scheduled jobs on the list has a particular execution time;

obtaining a notification time prior to the execution time of at least one of the scheduled jobs on the list of scheduled jobs;
generating a job execution notification that indicates:
the particular execution time of the at least one scheduled job, and
a tracking indicator of a number of times execution of the at least one scheduled job has been delayed;
transmitting, by the processing device, the notification to a user based on the determined notification time, wherein the notification displays the execution time and the tracking indicator to the user;
if a reply is received: determining if the reply includes a user-configured delay field; and
if the user-configured delay field is included, temporarily resetting a prescribed execution time of the at least one scheduled job based on a time value in the user-configured delay field to a delayed execution time; and
if no reply is received, executing the at least one scheduled job at the prescribed execution time.

11. The method of claim 10 further comprising: receiving at least one data set from a remote processing device; and executing the at least one scheduled job using the at least one data set.

12. The method of claim 11 further comprising: storing the at least one data set in a temporary data buffer prior to executing the scheduled job.

13. The method of claim 10 wherein if the prescribed execution time is delayed based on the delay field, the method further comprising:
generating a subsequent job execution notification when the delayed execution time is within a time interval;
transmitting the subsequent notification to the user; and
if a reply to the subsequent notification is received:
determining if the reply to the subsequent notification includes a delay field; and if the delay field is included in the reply to the subsequent notification, temporarily resetting the delayed execution time to a reset execution time based on the delay field; and
if no reply to the subsequent notification is received, executing the at least one scheduled job at the delayed execution time.

14. The method of claim 10 wherein the notification is transmitted to the user using a wireless transmission.

15. The method of claim 14 wherein the notification is a short messaging service (SMS) message.

16. The method of claim 10, wherein the transmitting comprises:
selecting one destination device from a plurality of destination devices based on a setting in the processing device.

17. The method of claim 10, further comprising:
combining multiple notifications into either a single packet of notifications or into a single transmission.

18. A system for managing the timing of the execution of a scheduled job that is a batch process executed by a computer system, the system comprising:
a memory device coupled to a local processing device having a list of scheduled jobs and either prescribed or reset execution times stored therein;
the local processing device for executing the scheduled job at a prescribed execution time; and
at least one remote processing system generating one or more data sets usable by the scheduled job;
wherein:
the local processing device, prior to the prescribed execution time, is operative to:
obtain a notification time from the memory device for transmitting a job execution notification to a user;
generate the job execution notification that indicates:
the prescribed execution time of a scheduled job; and
a tracking indicator of a number of times execution of the job has been delayed; and
transmit the notification to the user based on the notification time, the notification displaying the execution time and the tracking indicator to the user; and
if a reply is received, the local processing device:
determines if the reply includes a user-configured delay field; and
if the user-configured delay field is included, temporarily resets the prescribed execution time to a reset execution time based on a time value in the user-configured delay field; and
if no reply is received, receives one or more data sets and executes the scheduled job at the prescribed execution time.

19. The system of claim 18 further comprising: a temporary data set buffer for storing the data sets.

20. The system of claim 18, wherein the local processing device is further operative to: after receiving a delay field, generate a second job execution notification at a second notification time prior to the reset execution time.

21. The system of claim 18, wherein the local processing device is further operative to:
generate a subsequent job execution notification;
transmit the subsequent job execution notification to the user;
if a reply to the subsequent job execution notification is received:
determine if the reply to the subsequent job execution notification includes a delay field; and
if the delay field is included in the reply to the subsequent job execution notification, temporarily reset the reset execution time to a subsequent reset time based on the delay field; and
if no reply is received, execute the scheduled job at the reset execution time.

22. The system of claim 18 wherein the notification is transmitted to the user using a wireless transmission.

23. The system of claim 22 wherein the notification includes a short messaging service (SMS) message.

24. The system of claim 18, wherein a setting in the local processing device indicates different destination devices to which the job execution notification is to be transmitted in order to notify the user.

25. The system of claim 18, wherein multiple notifications are combined and sent in a single packet of notifications or combined into a single transmission.

26. An apparatus for managing the timing of the execution of a scheduled job that is a batch process executed by a computer system, the apparatus comprising:
a memory device coupled to a processing device having a list of scheduled jobs, execution times and notification times stored therein; and
the processing device for executing the scheduled job from among a plurality of scheduled jobs at an prescribed execution time, the processing device, prior to the prescribed execution time, operative to:
access both the prescribed execution time and a notification time for the scheduled job from the list of plurality of scheduled jobs, execution times, and notification times stored in the memory device;

generate a job execution notification that indicates:
the prescribed execution time of a scheduled job, and
a tracking indicator of a number of times the job execution has been delayed; and transmit the generated notification to a user when a current time is the prescribed execution time minus the notification time, wherein the notification displays the execution time and the tracking indicator to the user;

wherein if a reply is received by the processing device in response to the notification to the user, the processing device:
determines if the reply includes a user-configured delay field; and
if the user-configured delay field is included, temporarily resets the prescribed execution time to a reset execution time based on a time value in the user-configured delay field; and
if no reply is received in response to the notification to the user, executes the scheduled job at the prescribed execution time.

27. The apparatus of claim 26, wherein the processing device is further operative to:
after receiving a delay field, generate a second job execution notification at a second notification time prior to the reset execution time.

28. The apparatus of claim 26, wherein the processing device is further operative to:
generate a next job execution notification;
transmit the generated next job execution notification to the user;
if a reply is received to the generated next job execution notification:
determine if the reply to the generated next job execution notification includes a delay field; and
if the delay field is included, temporarily reset the prescribed execution time based on a time value in the delay field included in the reply to the next job execution notification; and
if no reply is received, execute the scheduled job at the prescribed execution time.

29. The apparatus of claim 26, wherein multiple notifications are combined and sent in a single packet of notifications or combined into a single transmission.

* * * * *